US011444996B2

(12) United States Patent
Augé et al.

(10) Patent No.: US 11,444,996 B2
(45) Date of Patent: Sep. 13, 2022

(54) TWO-LEVEL CACHE ARCHITECTURE FOR LIVE VIDEO STREAMING THROUGH HYBRID ICN

(71) Applicant: Cisco Technology, Inc., San Jose, CA (US)

(72) Inventors: Jordan François Jean Augé, Saint-Cyr-l'ecole (FR); Jacques Olivier Samain, Paris (FR); Mohammed Hawari, Montigny-le-bretonneux (FR); Alberto Compagno, Issy les Moulineaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/852,635

(22) Filed: Apr. 20, 2020

(65) Prior Publication Data

US 2021/0329046 A1    Oct. 21, 2021

(51) Int. Cl.
*H04L 65/61* (2022.01)
*H04L 65/1023* (2022.01)
*H04L 65/65* (2022.01)
*H04L 65/80* (2022.01)
*H04L 65/612* (2022.01)

(52) U.S. Cl.
CPC .......... *H04L 65/61* (2022.05); *H04L 65/1023* (2013.01)

(58) Field of Classification Search
CPC .................. H04L 65/4069; H04L 65/1023
USPC ........................................................ 709/225
See application file for complete search history.

(56) References Cited

U.S. PATENT DOCUMENTS 7,124,205 B2    10/2006  Craft et al.
9,172,640 B2 *  10/2015  Vincent ................... H04L 63/20
9,319,311 B2 *   4/2016  Wang ..................... H04L 49/355
(Continued)

FOREIGN PATENT DOCUMENTS

WO      2018182467 A1   10/2018

OTHER PUBLICATIONS

Yao, Xiaoyu et al., "Toward Effective NIC Caching: A Hierarchical Data Cache Architecture for iSCSI Storage Servers", 2005 International Conference on Parallel Processing (ICPP'05), Jun. 2005, 8 pages.

(Continued)

*Primary Examiner* — Anh Nguyen
*Assistant Examiner* — Tony Williams
(74) *Attorney, Agent, or Firm* — Edell, Shapiro & Finnan, LLC

(57) ABSTRACT

A method is provided that is performed by a smart network interface card (SmartNIC) that is in communication with a host device that serves as a forwarder in an Hybrid Information-Centric Network (hICN). The method includes storing in a memory of the SmartNIC, mapping information that maps a subset of names of content contained in a content store that is stored in a memory of the host device to corresponding addresses of the content. The method further includes receiving at the SmartNIC, from a requester, an interest that includes a name, and determining whether the name of the interest is included in the mapping information stored in the SmartNIC. The method includes processing the interest based on whether the name of the interest is contained in the mapping information stored in the memory of the SmartNIC.

20 Claims, 8 Drawing Sheets

(56) References Cited

U.S. PATENT DOCUMENTS

| | | | |
|---|---|---|---|
| 9,626,413 B2 | 4/2017 | Mosko | |
| 10,216,666 B2 | 2/2019 | Shalom et al. | |
| 2002/0161919 A1* | 10/2002 | Boucher | H04L 49/90 |
| | | | 709/238 |
| 2014/0192717 A1* | 7/2014 | Liu | H04L 67/16 |
| | | | 370/328 |
| 2016/0191385 A1* | 6/2016 | Lopez | H04L 67/327 |
| | | | 370/392 |
| 2016/0301613 A1* | 10/2016 | Boucher | H04L 45/66 |
| 2017/0180257 A1* | 6/2017 | Guichard | H04L 67/02 |
| 2018/0097908 A1* | 4/2018 | Ayyagari | H04L 67/2852 |
| 2018/0146058 A1* | 5/2018 | Somayazulu | G06F 16/23 |
| 2018/0241669 A1* | 8/2018 | Muscariello | H04L 63/10 |
| 2020/0036779 A1 | 1/2020 | Enguehard et al. | |

OTHER PUBLICATIONS

Kim, Hyong-youb et al., "Increasing Web Server Throughput with Network Interface Data Caching", 2002 ACM 1-58113-574-2/02/0010, Oct. 2002, 12 pages.

Krishnamurthy, Raj et al., "A Network Co-processor-Based Approach to Scalable Media Streaming in Servers", 0-7695-0768-9/00, Aug. 2000, 10 pages.

\* cited by examiner

TWO-LEVEL CACHE ARCHITECTURE FOR LIVE VIDEO STREAMING THROUGH HYBRID ICN

TECHNICAL FIELD

The present disclosure relates video streaming communications.

BACKGROUND

The Hybrid Information-Centric Networking (hICN) architecture proposes a new networking paradigm, natively supporting content storage, caching and retrieval. Compared to traditional content distribution techniques, hICN has been shown to bring considerable scalability benefits, especially for live video distribution. For example, streaming platforms internally rely on techniques to improve scalability and support scenarios with millions of clients consuming the same content at the same time.

DESCRIPTION OF EXAMPLE EMBODIMENTS

Overview

Figure 1:
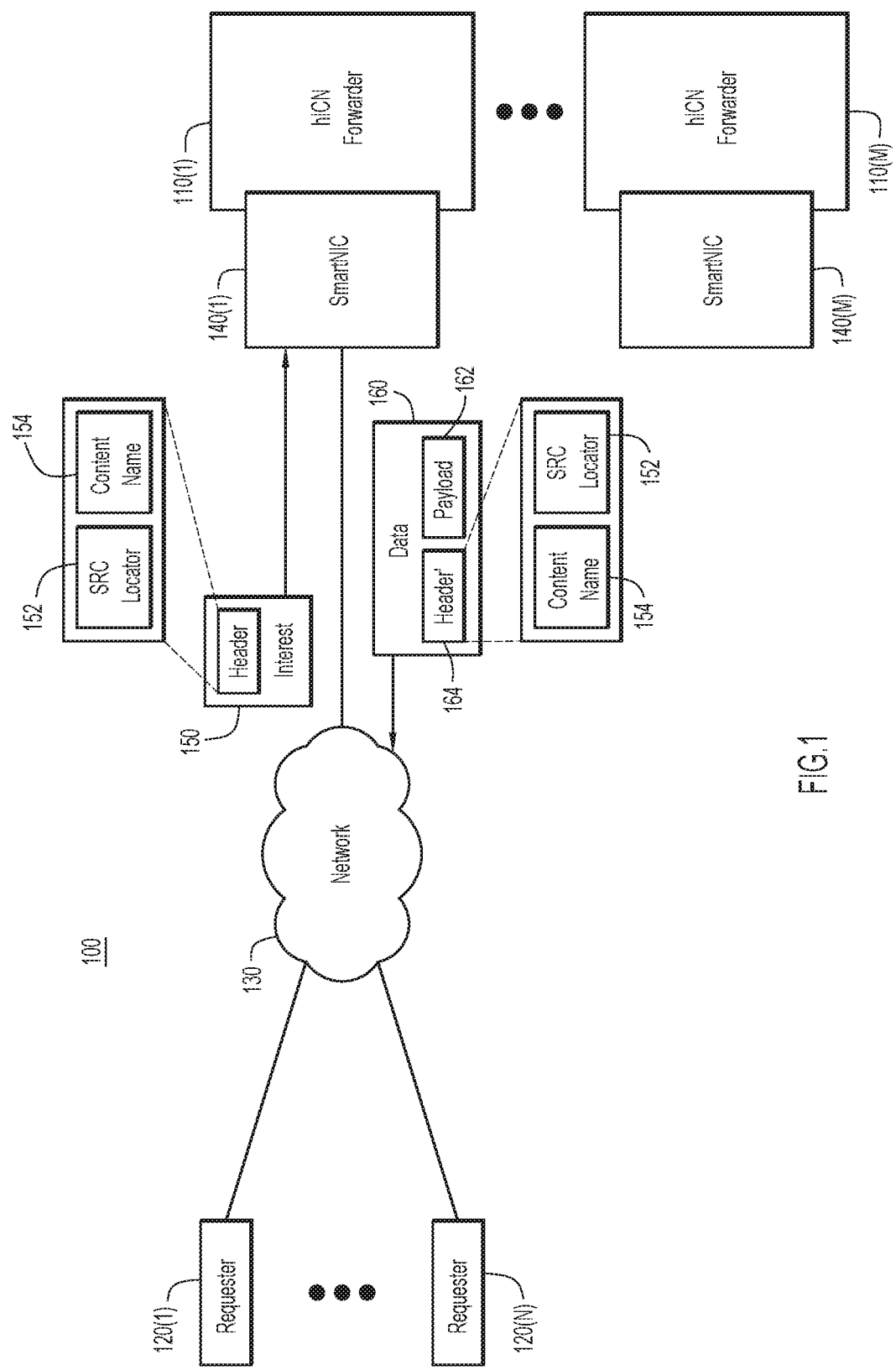
FIG. 1 is a block diagram of an hybrid Information-Centric Networking (hICN) environment including one or more hICN forwarders and associated Smart network interface cards (SmartNICs) configured to perform offloading of processing of interests, according to an example embodiment.

In one embodiment, a method is provided that is performed by a smart network interface card (SmartNIC) that is in communication with a host device that serves as a forwarder in an Hybrid Information-Centric Network (hICN). The method includes storing in a memory of the SmartNIC, mapping information that maps a subset of names of content contained in a content store that is stored in a memory of the host device to corresponding addresses of the content. The method further includes receiving at the SmartNIC, from a requester, an interest that includes a name, and determining whether the name of the interest is included in the mapping information stored in the SmartNIC. The method includes processing the interest based on whether the name of the interest is contained in the mapping information stored in the memory of the SmartNIC. In one embodiment, the subset of names included in the mapping information stored in the memory of the SmartNIC is for relatively high popular data (requested by numerous endpoints) that is associated with relatively short intervals of video content of a video streaming event.

Example Embodiments

Large scale streaming services may cache content to avoid requesting the same information to a given region. These services also employ mechanisms to try to coalesce requests for similar content, in order to avoid requesting the same content until cache is populated.

Information-Centric Networking (ICN) architectures such as Named-Data Networking (NDN), FD.io Community ICN (CICN), or Hybrid ICN (HICN or hICN) introduce location-independent names at the network layer and use them as communication identifiers in place of host locators for a more efficient, mobility-robust and secure content-based communication.

A benefit of hICN is that it has a built-in caching functionality and is able to do content distribution in a very efficient manner. hICN can perform these caching functions within the network architecture itself, and therefore it is readily adaptable to serve large scale media distribution. Moreover, because caching can be done natively in an hICN, control mechanisms can be injected into the media stream more easily. There is no need to stack up different network applications to insert such control mechanisms. There is a desire to extend the caching capability beyond what is provided by the hICN architecture itself by doing some hICN processing offload to a suitably capable network interface card (NIC).

When a large scale (sometimes live) streaming event (television program, sporting event, entertainment event, etc.) starts, there may be a big surge on requests for the same content. For these types of events, the requests may be concentrated to a very small amount of content associated with a very small time window. As a result, a benefit can be achieved by an offloading mechanism to a NIC with sufficient computing capabilities, to address this type of situation and other situations that would benefit from offloading hICN processing to a NIC.

However, current streaming techniques are reaching their limits for these types of streaming scenarios. Currently, operators are forced to use costly horizontal scaling (i.e., deploying more servers) in order to cope with such transient but elevated demand.

Presented herein is a system and method that leverage the hICN architecture and the programmability brought by so called "smart" network interface cards (SmartNICs) to solve that issue and improve scalability. A SmartNIC is a NIC that has more network processing features and computing capability than a standard or basic NIC. Another term used for SmartNIC is an "intelligent" NIC (iNIC).

Existing media distribution solutions rely on Hypertext Transfer Protocol (HTTP) and other similar types of connections where there is a N:1 connection to a server that is serving content. In hICN, there is no "connection" per se. Rather, a server responds to interests from wherever those interest are sourced. There is so real "connection" established with the server. Moreover, security in the existing solutions is handled by securing the connection, whereas in hICN, security is achieved by encrypting the content that is included in the response packets.

Referring to first to FIG. 1, is a simplified block diagram is shown that illustrates example details of an example hybrid ICN (hICN) network 100 that can support the techniques presented herein. The hICN network 100 may include one or more hICN forwarders 110(1)-110(M) and a plurality of requesters 120(1)-120(N). The requesters 120(1)-120(N) may be user endpoint devices, such as personal computers, mobile personal devices (tablets or Smartphones), network-connected televisions, media streaming devices, etc. The requesters 120(1)-120(N) may also be referred to as clients.

The hICN forwarders 110(1)-110(M) are devices having hICN capabilities and which may cache content that one or more of the requesters 120(1)-120(N) may request. The requesters 120(1)-120(N) communicate with one of the hICN forwarders 110(1)-110(M) via network 130. The network 130 may include one or more additional hICN forwarders as well as network devices capable of Internet Protocol (IP) communication. The network 130 may include one or more wide area networks (WANs) and local area networks (LANs), including wireless networks. Each hICN forwarder 110(1)-110(M) includes a SmartNIC that may be configured to perform the offloading techniques presented herein. That is, hICN forwarder 110(1) includes a SmartNIC 140(1) and hICN forwarder 110(M) includes a SmartNIC 140(M).

Specifically, a system and method are provided that enables offloading at least a part of a Content Store functionality (as defined in the hICN architecture) into an internal memory of the SmartNIC associated with an hICN forwader, allowing content retrieval to be performed without any intervention from the main central processing unit (CPU) of a host device (the hICN forwarder). The amount of memory usually embedded on a SmartNIC is not a limiting factor for massive live event streaming, because at any point in time, most of the clients will be requesting audio/video content corresponding to a unique, seconds-wide, time window. In other words, if a SmartNIC caches the video corresponding to the few most recent seconds of video content, the SmartNIC can serve at line rate most client requests, with minimal communication with the host device CPU.

A brief explanation of the hICN architecture is provided. An hICN architecture includes: (1) naming due to mapping introduced by hICN of content names into IP addresses; and (2) forwarding and routing in which hICN architectures can enable any combination of name-based (e.g., conventional ICN forwarding and routing) and standard location-based (e.g., IP forwarding and routing) over a same IP infrastructure.

In some embodiments, hICN design principles can be used to map or encode ICN content names into network layer (e.g., IP) addresses while preserving the name-prefix hierarchy. As such, hICN design principles can be used to implicitly transform regular IP routing and forwarding into their name-based counterpart, leveraging IP forwarding available in standard IP-based equipment, while not preventing the addition of ICN forwarding on top of IP forwarding as part of hICN logic provisioned for such equipment.

Consider one illustrative example content name/ABCDE/ctao/wp/hicn/5. In practice, the content name can be encoded in a number of bits, which may be encoded, at least in part, in an IPv4 address (e.g., 32-bits) or IPv6 address (e.g., 128-bits). In this particular example: the routable prefix is/ABCDE, the resource identifier is/ctao/wp, the resource name is/hicn, and the segment identifier is/5. In various embodiments, the hierarchical naming scheme can vary depending on applications, needs, implementations, or the like.

In general, a routable prefix can represent a routable identifier that can be used to find one or multiple resources. The resource identifier can represent the path within which a set of resources are grouped (e.g., a folder name, a directory, etc.). The resource name can represent an identifier of a particular resource within a set (e.g., a specific file in a folder or directory). The segment identifier can be used to identify the resource or parts of the resource. Segmentation of a resource can vary, for example, based on how a producer segments its resources. In some embodiments, the segment identifier can be a sequence number, a time pointer, or a byte offset. In general, components of the content name together can identify the content of interest. The ICN content name can be mapped to IP addresses in different ways.

FIG. 1 shows an Interest 150 that is received at the SmartNIC 140(1) of hICN forwarder 110(1) from one of the requesters 120(1)-120(N). The Interest 150 includes a source (src) locator 152 and an hICN content name 154. The src locator 152 may be, for example, the IP address of one of the requesters 120(1)-120(N). The content name 154 may be an hICN name for content that is cached by one (or more) of the hICN forwarders 110(1)-110(M), such as hICN forwarder 110(1). Using the partial offloading techniques presented herein and described in more detail below, the SmartNIC 140 retrieves the appropriate data for the content name by looking up the name in a Content Store. The SmartNIC 140(1) then generates a data packet 160 by appending the retrieved data 162 to a new header 164 that is constructed from the Interest 150, including a swap of the src locator 152 and content name 154.

Thus, to create the reply/response hICN data packet, the header of the packet can be forged from the header of the Interest by swapping the addresses, because the addresses are IP addresses, and the payload is data obtained from the cached CS content in the host. Thus, in the hICN scheme, part of the response comes from forging the header at the SmartNIC 140(1).

The SmartNIC 140 includes more computing/processing capability than a basic NIC. For example, the SmartNIC may include a Field Programmable Gate Array (FPGA), an Intel Pentium® 4 (P4) processor, multiple core central processing unit (CPU), or other suitable computing/processor component, etc.

Full Content Store Data in hICN Forwarder (Host)

Figure 2:
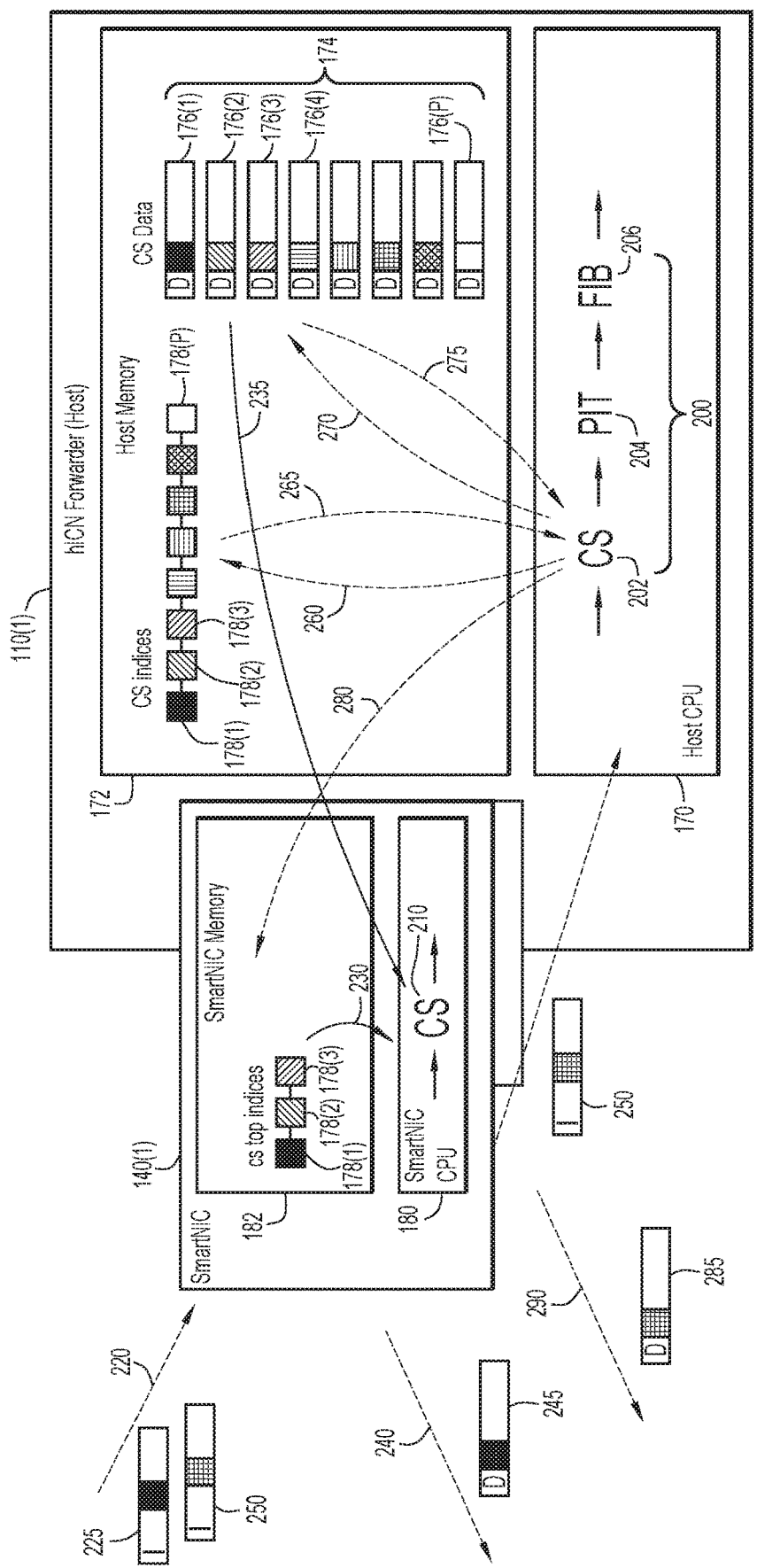
FIG. 2 is a block diagram a configuration of an hICN forwarder and associated SmartNIC in which the SmartNIC stores indices to a subset of names for data in a Content Store that is stored in memory of the hICN forwarder, according to an first example embodiment.

Reference is now made to FIG. 2. FIG. 2 shows a configuration of the hICN forwarder 110(1) and SmartNIC 140(1) to support offloading techniques, according to a first example embodiment. The hICN forwarder 110(1), also called a host server or host device, includes a host CPU 170 and a host memory 172. The host memory 172 stores, among other things, Content Store (CS) data 174 consisting of cached content, denoted by the individual data (D) items or blocks 176(1)-176(P). The data may be different for different intervals of video content, as an example. The host memory 172 also stores a set of CS top indices 178(1)-178(P) that map content names to addresses of respective ones of the individual data items or blocks 176(1)-176(P) of CS data 174 stored in host memory 172.

The SmartNIC 140(1) includes a SmartNIC CPU 180 and a SmartNIC memory 182. As explained above, the SmartNIC CPU 180 may take the form of a Field Programmable Gate Array (FPGA), an Intel Pentium® 4 (P4) processor, multiple core CPU, or other computing/processor component, etc.

In the embodiment of FIG. 2, the CS data is stored entirely in host memory 172 but the SmartNIC 140(1) stores mapping information (such as in the form of a table) that maps a subset of the names contained in the CS 174 to the corresponding addresses of content stored in host memory 172. In one example, the SmartNIC memory 182 stores a mapping of content name to address in host memory 172 for the most used or accessed content, or most recently issued video of a particular stream). For example, FIG. 2 shows by the shading gradation from dark to light of the data items in the CS 174, of the most frequently accessed (i.e., most popular) to the least frequently accessed (i.e., least popular) data items, where data item 176(1) is the most popular and data item 176(P) is the least popular. Accordingly, the SmartNIC stores the CS top indices 178(1), 178(2) and 178(3), which map content names to addresses for data items 176(1), 176(2) and 176(3), respectively, in SmartNIC memory 182, as shown in FIG. 2. The identification of which names to include in the mapping information stored in the SmartNIC memory 182 may be determined by the SmartNIC CPU 180 or by the host CPU 170, based on statistical analysis of names included in interests that are received at the hICN forwarder 110(1).

Again, the host memory 172 stores the full CS content 174, and the full associated indices 178(1)-178(P), while the SmartNIC memory 182 only stores the more popular content name-address indices, pointing to addresses in the host memory 172 and allowing for direct memory address (DMA) retrieval of data items from the host memory 172. While FIG. 2 shows three indices 178(1)-178(3) that form the mapping information stored in SmartNIC memory 182, this is only an example and there may be fewer or more indices forming the mapping information stored in SmartNIC memory 182.

The following is a simplified example of the CS indices stored in the SmartNIC memory 182.

| Name | Address (in Host Memory) |
|---|---|
| Name1 | Host Memory Address1 |
| Name2 | Host Memory Address2 |
| Name3 | Host Memory Address3 |
| . . . | . . . |

Below is a simplified example of the CS data 174 stored in the host memory 172.

| Host Memory Address | Address (in Host Memory) |
|---|---|
| Host Memory Address1 | Data1 (for Name1) |
| Host Memory Address2 | Data2 (for Name2) |
| Host Memory Address3 | Data3 (for Name3) |
| . . . | . . . |
| Host Memory AddressP | DataP (for NameP) |

As shown in FIG. 2, the host CPU 170 is configured to perform a full forwarding pipeline set of operations 200 that includes a host CPU CS lookup operation 202, a Pending Interest Table (PIT) lookup 204 (if needed), and a Forwarding Information Base (FIB) lookup 206. The host CPU CS lookup operation 202 has read/write (R/W) access to the host memory 172, and also writes to the SmartNIC memory 182. Since these techniques are on the server side, there may be no need to be concerned with the PIT in the hICN forwarder 110(1) because the time between the request and the reply to the content is very small and most of the requests will be satisfied by the CS.

The SmartNIC CPU 180 is configured only to perform a SmartNIC CS lookup operation 210, for the subset of indices, e.g., indices 178(1), 178(2) and 178(3), stored in the SmartNIC memory 182. The SmartNIC CS lookup operation 210 therefore only reads from the SmartNIC memory 182 and from the host memory 172. There is no need to wake up the full forwarding pipeline of operations in the host CPU 170 for those content names whose indices are stored in the SmartNIC memory 182. There is some need to move data within the host (on a host bus, not shown) to retrieve the data from the host memory 172 but there is no need to interrupt the system and no need to wake the host CPU 170 for such processing of the name entries cached in the SmartNIC 140(1).

Upon reception of an Interest, the SmartNIC 140(1) autonomously initiates a DMA transfer of the CS data contained in host memory 172 to the SmartNIC 140(1), and builds the corresponding hICN packets, before sending them on in the network to the requester. This lightens the load on the host CPU 170 (as most of the Interests are handled by the SmartNIC 140(1)), but still requires some bandwidth on the bus between the SmartNIC 140(1) and hICN forwarder 110(1) as the bulk of the data is still stored in host memory 172. However, each cached index entry in the SmartNIC does not require a lot of memory on the SmartNIC. Thus, a large number of entries (indices) may be stored in the SmartNIC memory 182.

The configuration depicted in FIG. 2 operates as follows. Consider two Interests of different popularity arriving on the SmartNIC 140(1).

Case A—High-popularity Interest

FIG. 2 shows at 220 the arrival of an Interest 225 at the SmartNIC 140(1). The Interest 225 includes a content name that is for high-popularity content such that an index for the content name of the Interest 225 is included in one of the cached indices stored in the SmartNIC memory 182. Thus, the Interest 225 is processed by the SmartNIC CS lookup operation 210 performed by the SmartNIC CPU 180. At 230, the SmartNIC CS lookup operation 210 performs an index lookup in the SmartNIC memory 182 to find the name of the Interest 225 and finds it in the SmartNIC memory 182, in, for example, index 178(1).

At 235, the SmartNIC 140(1) performs a DMA read from the host memory 172, retrieves the data at the address indexed to the name of the Interest (e.g., data item 176(1)), and updates the destination IP address with the source address of the Interest 225 to forge the response data packet. The response data packet is generated without the need to wake the host CPU 170.

At 240, the SmartNIC 140(1) sends the response data packet 245 directly back to the requester.

Case B—Low-Popularity Interest

FIG. 2 also shows the arrival of an Interest 250. The Interest 250 is a low-popularity request for content insofar as the Interest 250 is requesting data for a content name that is not included in the indices stored in the SmartNIC memory 182. Operation of the SmartNIC 140(1) and hICN forwarder 110(1) of Interest 250 is as follows.

The Interest 250 is processed by the SmartNIC CS lookup operation 210, as shown at 230. The SmartNIC CS lookup operation 210 performs an index lookup based on the name of the Interest and finds that name of the Interest 250 is not contained in one of the indices 178(1), 178(2), 178(3) stored in the SmartNIC 140(1), and thus returns a miss for Interest 250 in the SmartNIC stored indices.

The SmartNIC therefore forwards the Interest 250 to the host CPU 170, as shown at 255, and processing of the Interest 250 follows the regular interest forwarding pipeline as shown at operations 260, 265, 270, 275 where it will eventually match the host CPU CS lookup operation 202, or continue through PIT 204 and/or FIB 206. Specifically, when the host CPU 170 processes the Interest 250, at 260, it looks up in the indices 178(1)-178(P) to find the index having the content name that matches the name in the Interest to obtain the associate address for the data for that name, at 265. At 270, using that address, the host CPU 170 accesses the CS data 174 to retrieve, at 275, the data at that address. The host CPU 170 then, at 280, provides the retrieved data to the SmartNIC 140(1). The SmartNIC forges the header onto the data to generate a response data packet 285, and the SmartNIC 140(1) sends the response data packet 285 to the requester, as shown at 290.

It has been determined that very few pieces of content make up most of the demand at any given moment for certain high-demand streaming events. For example, 20 percent of the content may make up 95 percent of the load on the hICN forwarder. Thus, by caching (indices for) only a very few small pieces of content on the SmartNIC, it is possible save most of the demand on the host CPU of the hICN forwarder 110(1). When there is a lot of relatively small items of content that is being requested from numerous requesters, it is much preferred to avoid waking up the host CPU 170 of the hICN forwarder 110(1) for each of the requests because that is ineffective use of the host CPU 170. Relatively "small items of content" generally means that the buckets of data are small such that there will be numerous buckets of data per a given time interval (e.g., per second). There is a higher "fixed" utilization cost of the host CPU 170 if it were to process every one of these types of requests.

Content Store Data in Host/Most Popular Data in Smart-NIC

Figure 3:
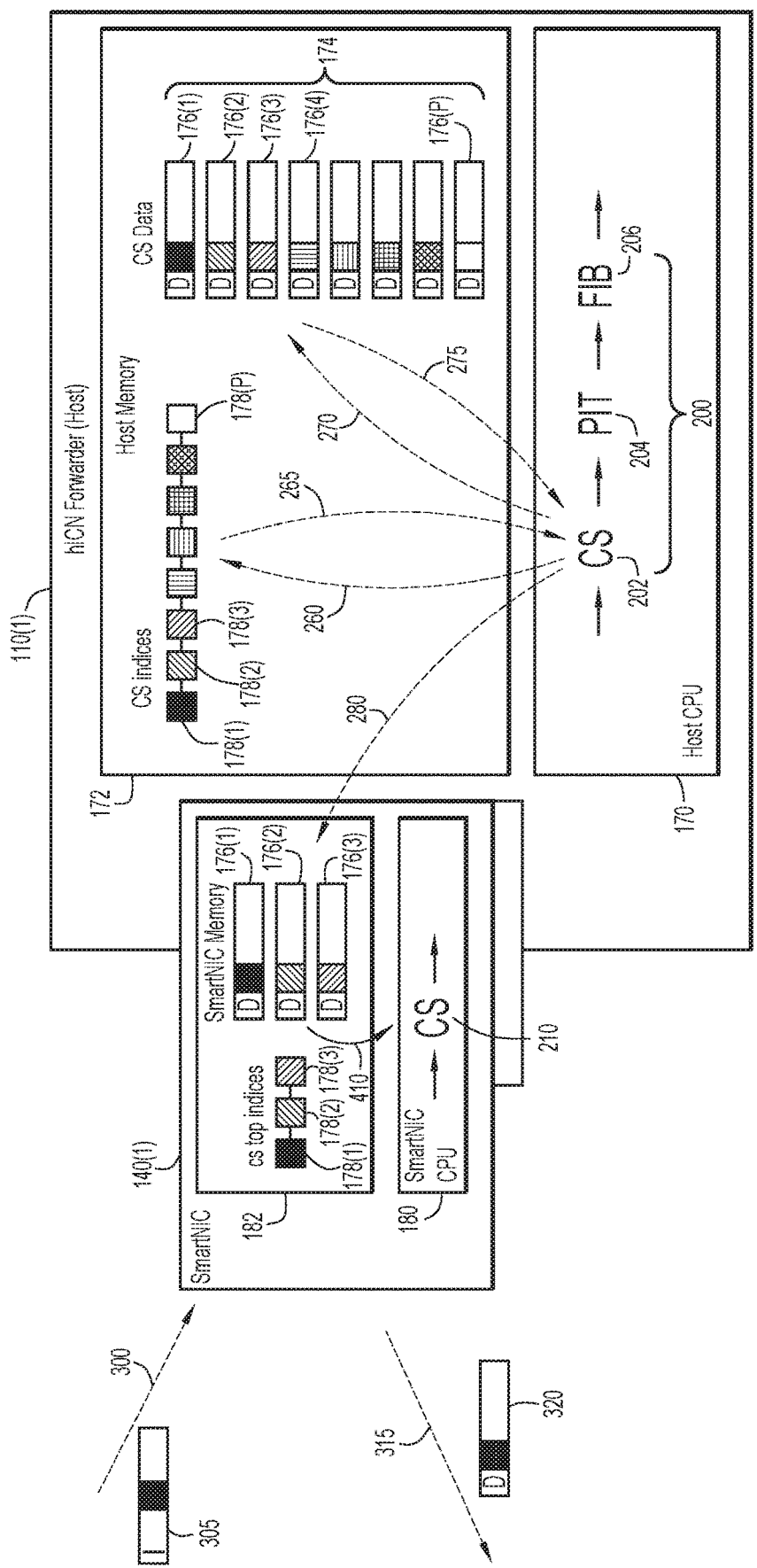
FIG. 3 is a block diagram of a configuration of an hICN forwarder and associated SmartNIC in which the SmartNIC stores indices to a subset of names for data that is stored in memory of the SmartNIC, according to an second example embodiment.

Reference is now made to FIG. 3. FIG. 3 illustrates a variation of FIG. 2 in which some of the CS data that is stored in the host memory 172 is also stored in the SmartNIC memory 182. Specifically, as shown in FIG. 3, in addition to storing the CS top indices 178(1), 178(2) and 178(3), the SmartNIC memory 182 stores the data items 176(1), 176(2) and 176(3) for the names associated with the indices 178(1), 178(2) and 178(3).

Upon reception of an Interest, the SmartNIC 140(1) would then try to match the requested name against the mapping information (indices for subset of names) stored in SmartNIC memory 182. In case of a positive result (a match), the hICN packets are built in a manner similar to that depicted in FIG. 2, except that no DMA is performed to the host memory 172 as the CS data is locally available at the SmartNIC 140(1). In case of a negative result (a miss), the SmartNIC 140(1) forwards the Interest to the host CPU 170 for regular processing (including a regular CS lookup). The configuration of FIG. 3 potentially allows inter-device bus bandwidth savings on the bus between the host and the SmartNIC, at the expense of a higher consumption of embedded memory on the SmartNIC 140(1). This configuration conserves both the host CPU utilization and bus bandwidth. For simplicity, only the processing of the Interests that are cached on the SmartNIC 140(1) is shown in FIG. 3.

The table below represents the mapping information of the indices 178(1), 178(2) and 178(3) stored in the SmartNIC memory 182.

| Name | Address (in SmartNIC Memory) |
| --- | --- |
| Name1 | SmartNIC Memory Address1 |
| Name2 | SmartNIC Memory Address2 |
| Name3 | SmartNIC Memory Address3 |

The data stored in the SmartNIC memory 182 may be stored according to the table set forth below.

| SmartNIC Memory Address | Address (in SmartNIC Memory) |
| --- | --- |
| SmartNIC Memory Address1 | Data1 (for Name1) |
| SmartNIC Memory Address2 | Data2 (for Name2) |
| SmartNIC Memory Address3 | Data3 (for Name3) |

The processing flow for an Interest in the configuration of FIG. 3 is now described.

At 300, the SmartNIC 140(1) receives an Interest 305. At 310, the SmartNIC CPU 180 performs a CS lookup operation to find the name of the Interest 305 in the cached indices 178(1), 178(2) and 178(3). The SmartNIC CPU 180 finds a match to one of the indices 178(1)-178(3) and retrieves the associated data from the SmartNIC memory 182. The SmartNIC CPU 180 then generates a response data packet using the data obtained from the SmartNIC memory 182 that satisfies the name contained in the Interest 305. At 315, the SmartNIC 140(1) sends out the response data packet 320 to the requester. Accordingly, the SmartNIC 140(1) generates the response data packet 320 without the need to perform a DMA read from the host memory 172 and without waking the host CPU 170.

Processing of an Interest that contains a name for data that is not cached by the SmartNIC is performed in the manner as described above in connection with FIG. 2, as shown at operations 260-280 in FIG. 3.

Host Wake-Up for Offloaded Interests

Figure 4:
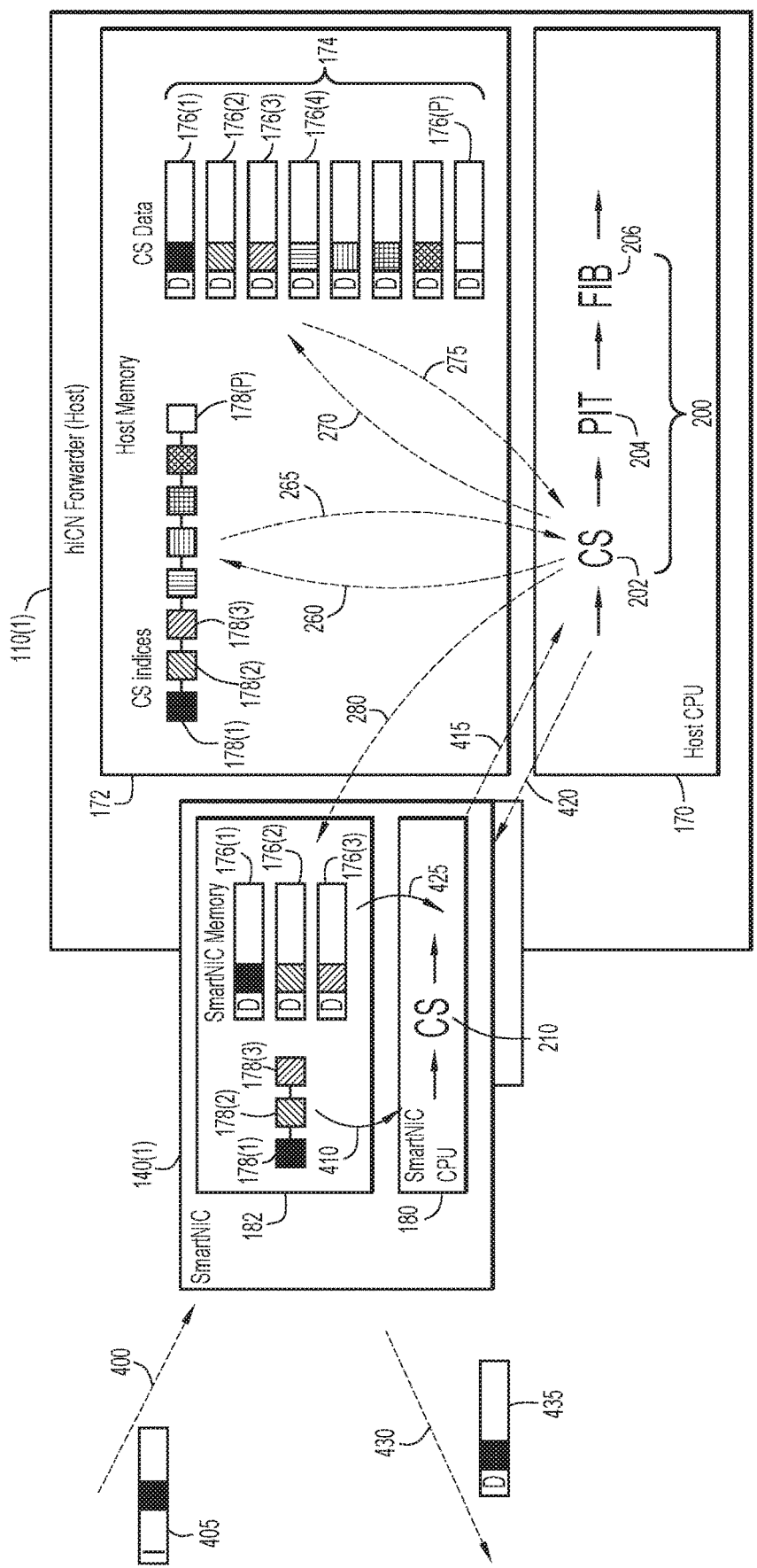
FIG. 4 is a block diagram of a configuration of an hICN forwarder and associated SmartNIC that is similar to FIG. 3, but in which the hICN forwarder generates packet header information that is supplied to the SmartNIC that generates the response data packet using data stored in memory of the SmartNIC, according to an third example embodiment.

FIG. 4 illustrates yet another configuration, building on the configuration of FIG. 3, but in which upon reception of an Interest, the SmartNIC 140(1) always forwards the Interest to the host CPU 170. The host CPU 170 has information indicating, or determines, whether the data of the Interest is only present in host memory 172 (case A below), or whether it is also present in the SmartNIC memory 182 (case B below).

In case A in which the data of the Interest is only present in the host memory 172, the host CPU builds the response hICN packets and transmits them to the SmartNIC 140(1) as is done on a regular commodity NIC.

In case B in which the data for the Interest is present in the SmartNIC memory 182, the host CPU 170 still builds the packet header, but the name of the content is included in the metadata of the packet, which is enqueued to the SmartNIC 140(1) for further processing and transmission. The SmartNIC 140(1) then obtains the packet header data from the host CPU 170, and matches the name included in the metadata against the data cached in SmartNIC memory 182. The SmartNIC 140(1) completes the transmission by concatenating the packet header data obtained from the host CPU 170 to the data for the name of the Interest retrieved from the SmartNIC memory 182.

Unlike the configurations of FIGS. 2 and 3, the configuration of FIG. 4 always involves the host CPU 170, and similar to the configuration of FIG. 3, bus bandwidth between the SmartNIC 140(1) and the host is conserved because, most of the time, the actual data is retrieved from SmartNIC memory 182. However, unlike the configuration of FIG. 3, the host CPU 170 always generates packet header information for response hICN data packets. This provides more flexibility in terms of implementing networking policies or services, such as encapsulation, tunneling, etc. Moreover, this allows the host CPU 170 to maintain software-level counters, which can be useful when implementing software-defined caching policies, such as when the host CPU 170 is to determine what content to store in the host memory 172, and what content to cache in the SmartNIC memory 182.

Again, the configuration of FIG. 4 involves obtaining the data for the packet from the content cached in the SmartNIC memory 182 (if that data is resident in the SmartNIC memory 182), but the host CPU 170 builds the header of the packet in order to support various networking services on the packet, such as tunneling, etc., if so desired.

Processing of an Interest for case B, where the data for the Interest is cached in the SmartNIC memory 182, is now described.

At 400, the SmartNIC 140(1) receives in Interest 405. The SmartNIC CPU 180 processes the Interest with the SmartNIC CS lookup operation 210.

Specifically, the SmartNIC CS lookup operation is performed at 410 in order to find the name of the Interest 405 in one of the cached indices 178(1)-178(3). The SmartNIC CPU 180 stores an indication that a match (hit) was found, in interest packet metadata that the SmartNIC CPU 180 provides, at 415, to the host CPU 170. The interest packet metadata may be stored as a descriptor in the SmartNIC receive (RX) Ring, and may include the following {Data=HostPhysicalAddressOfTheInterestPacketMetadata, LocalHit=True, Name=InterestName}, where "LocalHit=True" is a flag or indication that the data for the name of the Interest is present in the SmartNIC memory 182.

In the host CPU 170, the interest packet metadata follows the regular forwarding pipeline and enters the host CPU CS lookup operation 202 that handles forging the response data packet (in software that the host CPU 170 executes). Because the LocalHit flag is set to True in the interest packet metadata, indicating the offload by the SmartNIC 140(1), the host CPU 170 generates packet header metadata including the name of the Interest, stores the packet header metadata information in host memory 172 and at 420, enqueues into the SmartNIC transmit (TX) Ring a descriptor that includes the packet header metadata: {Data=HostPhysicalAddressOfTheForgedHeader, Name=InterestName, HeaderOnly=True}. When the host CPU 170 generates the packet header data that is stored at the address in the host memory 172, the host CPU may include in the packet header data appropriate information in the packet header data to support the aforementioned networking services, such as tunneling, encapsulation, etc.

At 425, the SmartNIC CPU 180 processes the descriptor received from the host CPU, and, because the HeaderOnly flag is set to True in the descriptor, the SmartNIC CPU 180 knows that the forged data is an address to data stored in host memory 172 that only contains packet header data (as opposed to what would happen upon a packet transmission by a regular commodity NIC). The SmartNIC 140(1) retrieves the data stored at the address specified in the packet header metadata to be used as the packet header for a response packet. By looking up name of the Interest the Name field in the descriptor in the SmartNIC memory 182, the SmartNIC CPU 180 retrieves the data for the name of the interest from the SmartNIC memory 182, and appends the data for the name in the interest to the packet header found at the address of the host memory 172 given by data of the descriptor.

At 430, the SmartNIC 140(1) sends the response data packet 435 to the requester.

In the particular scenario of live video streaming, future popular content is easily predictable and the hICN forwarder may push that content directly into the SmartNIC memory 182. Alternatively, content can be migrated to the SmartNIC memory upon ranking among the most popular ones, or through a cache replacement strategy (such as Last Recently Used (LRU)) implemented in a distributed fashion. The host CPU 170 coordinates with the SmartNIC CPU 180 to update indices (and data) that are stored in the SmartNIC memory 182 over a given time interval as the popularity of data requests changes, using various techniques known in the art.

Figure 5:
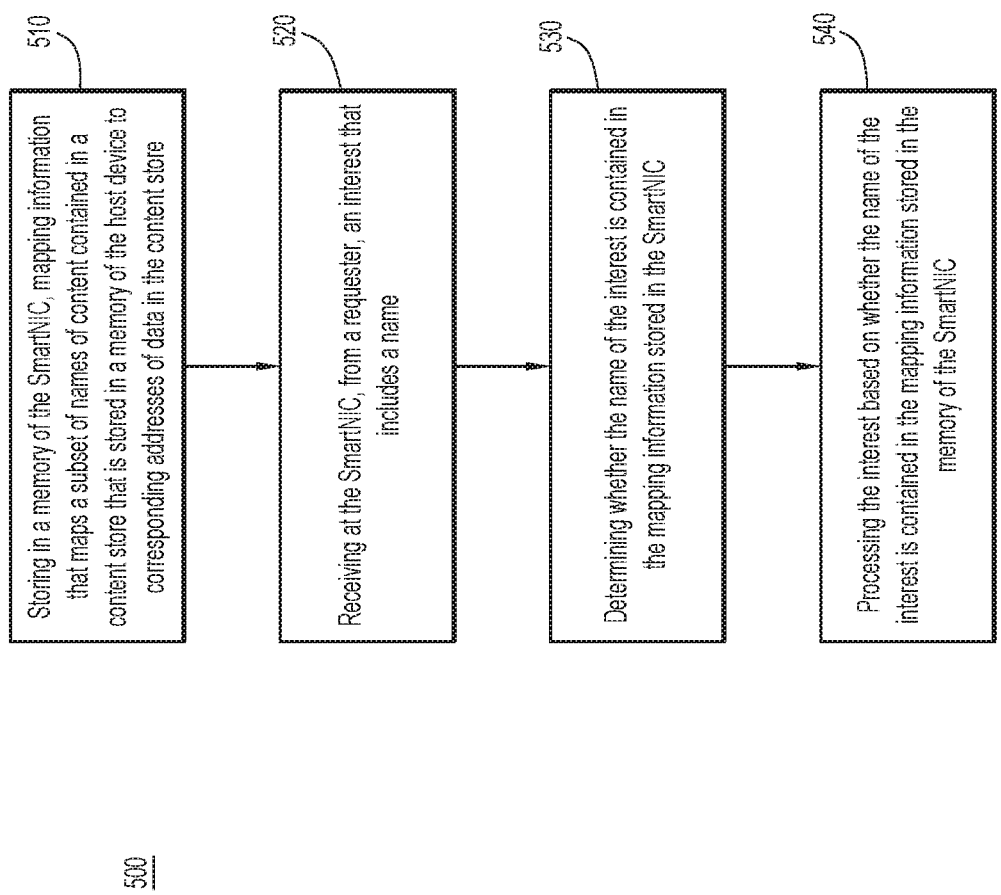
FIG. 5 is a flow chart of an hICN interest offloading method performed by a SmartNIC, according to an example embodiment.

Reference is now made to FIG. 5. FIG. 5 illustrates a flow chart for a method 500 performed by a SmartNIC according to the embodiments presented herein. The SmartNIC is in communication with a host device that serves as a forwarder in an Hybrid Information-Centric Network (hICN). At 510, the SmartNIC stores in a memory of the SmartNIC, mapping information that maps a subset of names of content contained in a content store that is stored in a memory of the host device to corresponding addresses of data in the content store.

At 520, the SmartNIC receives from a requester an interest that includes a name, and at 530, the SmartNIC determines whether the name of the interest is included in the mapping information stored in the SmartNIC.

At 540, the SmartNIC processes the interest based on whether the name of the interest is contained in the mapping information stored in the memory of the SmartNIC.

As described above in connection with the example configuration of FIG. 2, the mapping information (e.g., CS top indices 178(1), 178(2) and 178(3)), maps the subset of names to corresponding addresses (of data associated with the names) in the memory of the host device. Thus, when the SmartNIC determines that the name of the interest is included in the mapping information stored in the memory of the SmartNIC, the processing operation 540 includes: performing a memory access read operation by the SmartNIC from the memory of the host device based on the address contained in the mapping information for the name; retrieving, by the SmartNIC, data stored at the address in the memory of the host device; generating, by the SmartNIC, a data packet that includes the data and a destination address that corresponds to a source address of the interest; and forwarding, by the SmartNIC, the data packet to the requester.

Conversely, when the SmartNIC determines that the name is not included in the mapping information stored in the memory of the SmartNIC, the processing operation 540 includes: forwarding the interest to the host device to enable the host device to process the interest and return to the SmartNIC a data packet containing the data stored in the memory of the host device at an address corresponding to the name of the interest.

As depicted in FIGS. 2 and 3, the storing operation 540 further includes storing in the memory of the SmartNIC the content for the subset of names included in the mapping information, and the mapping information maps the subset of names of content stored to corresponding addresses in the memory of the SmartNIC.

As described above in connection with the example configuration of FIG. 3, when the SmartNIC determines that the name is included in the mapping information stored in the memory of the SmartNIC, the processing operation 540 includes: retrieving, by the SmartNIC, data stored at an address in the memory of the SmartNIC; generating, by the SmartNIC, a data packet that includes the data and a destination address that corresponds to a source address of the interest; and forwarding, by the SmartNIC, the data packet to the requester.

As described above in connection with the example configuration of FIG. 4, when the SmartNIC determines that the name is included in the mapping information stored in the memory of the SmartNIC, the processing operation 540 includes: generating interest packet metadata that includes the name of the interest and an indication that a match for the name of the interest is found in the mapping information stored in the memory of the SmartNIC; providing the interest packet metadata to the host device to enable the host device to generate packet header metadata, wherein the packet header metadata includes an address in the memory of the host device for data to be retrieved by the SmartNIC and an indication that the data that the data to be retrieved by the SmartNIC is packet header data; obtaining the packet header metadata from the host device; retrieving, by the SmartNIC, the data for the interest stored at the address in the memory of the SmartNIC; based on the indication and the address contained in the packet header metadata, retrieving, by the SmartNIC, the data at the address in the memory of the host device that is to be used as packet header data; generating, by the SmartNIC, a data packet that includes the data retrieved from the memory of the SmartNIC, the packet header retrieved from the memory of the host device, and a destination address that corresponds to a source address of the interest; and forwarding, by the SmartNIC, the data packet to the requester.

Figure 6:
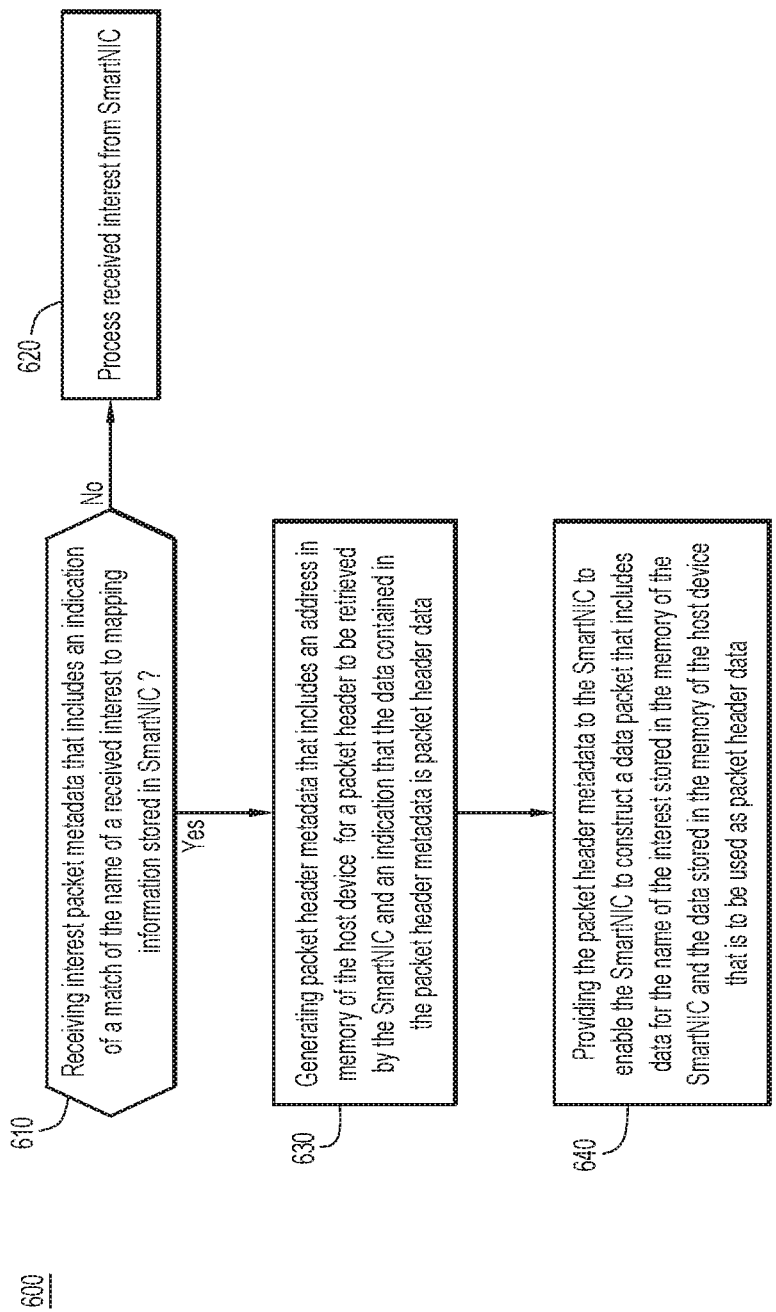
FIG. 6 is a flow chart depicting operations performed by the hICN forwarder as part of the interest offloading techniques depicted in FIG. 4, according to an example embodiment.

Reference is now made to FIG. 6. FIG. 6 shows a flow chart depicting a method 600 performed by the host device in connection with the embodiment of FIG. 4 that involves operations performed to coordinate the joint creation (by the SmartNIC and the host device) of a data packet to that is responsive to an interest. Reference is also made to FIG. 4 for purposes of this description. At 610, the host CPU receives from the SmartNIC interest packet metadata and determines whether the interest packet metadata includes an indication of a match of the name of a received interest to mapping information stored in the SmartNIC. If there is no such indication of a match, for an interest received from the SmartNIC, then the host device processes the interest in the standard manner, as shown at 620.

However, if the indication of a match is present in the interest packet metadata, then this signals to the host CPU that it needs to coordinate with the SmartNIC in creating the response data packet. Specifically, at 630, the host CPU generates packet header metadata that includes an address in the host memory of the host device for data to be retrieved by the SmartNIC, and an indication that the data to be retrieved by the SmartNIC is packet header data. At 640, the host CPU provides the packet header metadata to the SmartNIC to enable the SmartNIC to construct a data packet that includes data for the for the name of the interest stored in the memory of the SmartNIC and the data stored in the memory of the host device that is to be used as packet header data.

Figure 7:
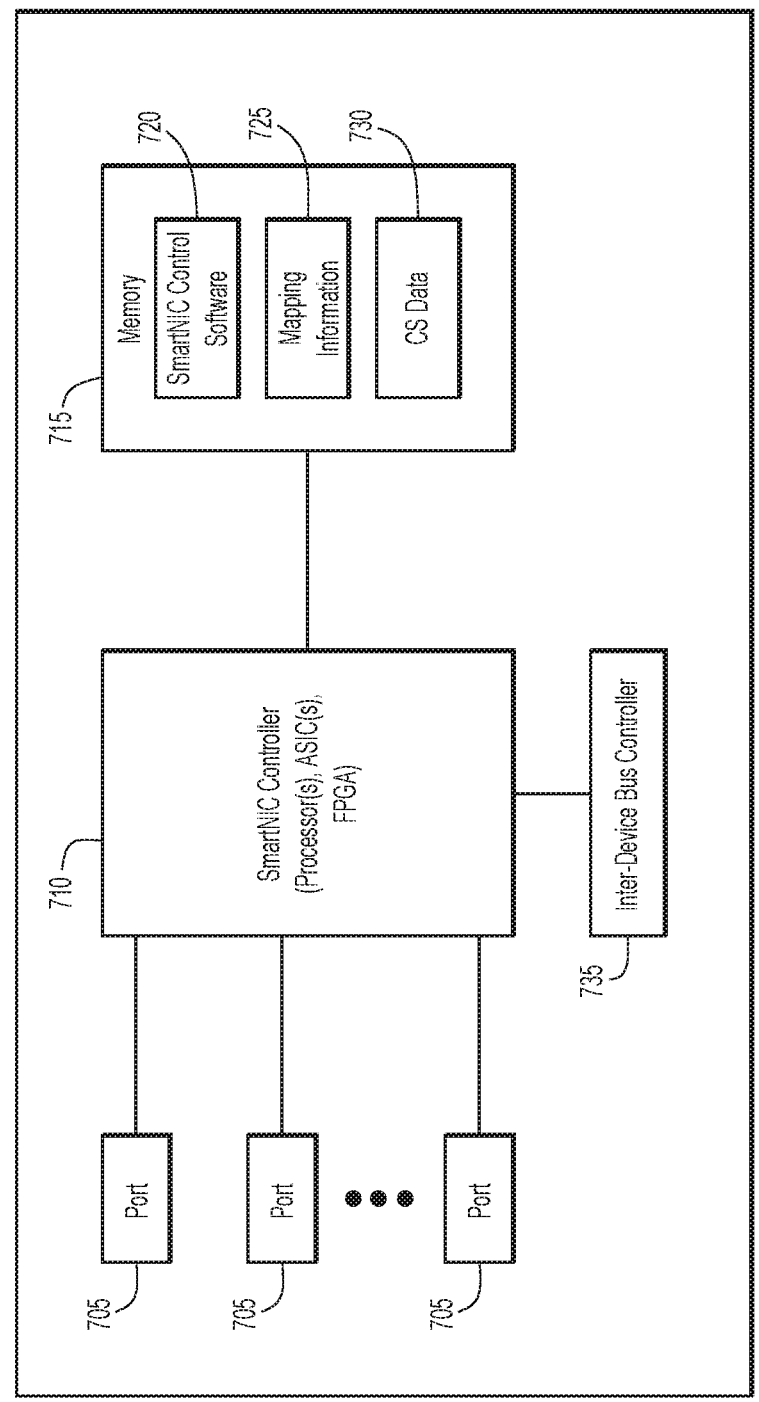
FIG. 7 is a block diagram of a SmartNIC configured to perform the interest offloading techniques, according to an example embodiment.

Turning now to FIG. 7, a more detailed block diagram of a SmartNIC configured to perform the SmartNIC operations presented herein, is now described. The SmartNIC 700 depicted in FIG. 7 may be representative of any of the SmartNICs 140(1)-140(M) shown in FIGS. 1-4. The SmartNIC 700 includes a plurality of ports 705, each of which can receive packets from a network and can send out packets to the network. A SmartNIC controller 710 is coupled to the plurality of ports 705. The SmartNIC controller 710 may be one or more processors (single or multi-core processors), one or more Application Specific Integrated Circuits (ASICs), one or more Field Programmable Gate Arrays (FPGAs), or any other computing component that is capable of performing the higher-functioning operations of the SmartNIC. The SmartNIC controller 710 is coupled to memory 715. The memory 715 stores executable instructions for SmartNIC control software 720 that, when executed by the SmartNIC controller 710 (in the case in which the SmartNIC controller is one or more processors), the SmartNIC controller 710 is caused to perform the SmartNIC operations presented herein. Moreover, the memory 715 stores the mapping information 725, which as described above in connection with FIGS. 1-5, may take the form of indices mapping (a subset of) names to addresses of data for content that is either stored in the memory 715 or in the host memory. In the variations of FIGS. 3 and 4, the memory 715 also stores the CS data 730 for the subset of names in the mapping information 725.

The SmartNIC 700 further includes an inter-device bus controller 735 that controls the exchange of information with the host device (hICN forwarder). In one example, the inter-device bus controller 735 is configured to operate in accordance with the Peripheral Component Interconnect Express (PCIe) bus standard.

It should be understood that in a software-implemented networking environment, the functions of the SmartNIC may be implemented entirely in software.

Figure 8:
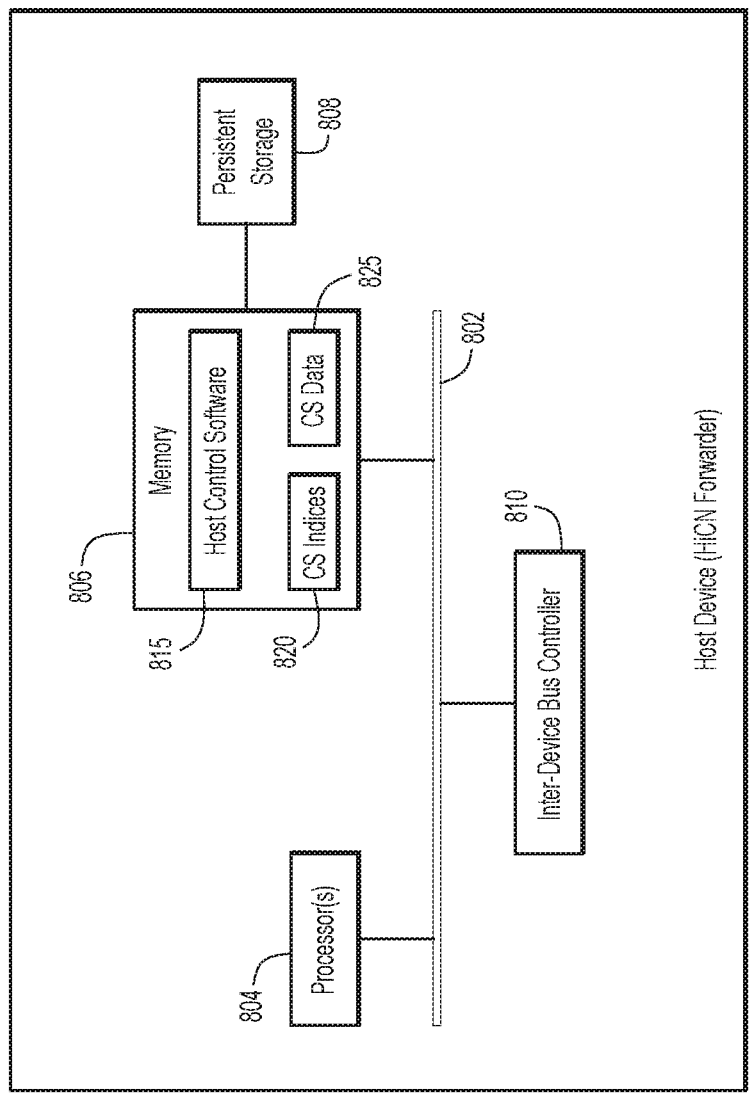
FIG. 8 is a block diagram of a computing device configured the operations of the hICN forwarder as part of the interest offloading techniques, according to an example embodiment.

FIG. 8 illustrates a hardware block diagram of a computing device 800 that may perform functions of an host device or hICN forwarder referred to above in connection with FIGS. 1-4. It should be appreciated that FIG. 8 provides only an illustration of one embodiment and does not imply any limitations with regard to the environments in which different embodiments may be implemented.

As depicted, the computing device 800 includes a bus 802 that provides communications between processor(s) 804, memory 806, persistent storage 808, and an inter-device bus controller 810. Bus 802 can be implemented with any architecture designed for passing data and/or control information between processors 804 (such as microprocessors, communications and network processors, etc.), memory 806, peripheral devices, and any other hardware components within a system. For example, bus 802 can be implemented with one or more buses. The processors 804 may take the form of one or more microprocessors or other suitable processing components now known or hereinafter developed, which are useful in server computers.

Memory 806 and persistent storage 808 may be computer readable storage media. Memory 806 may include random access memory (RAM). In general, memory 806 can include any suitable volatile or non-volatile computer readable storage media. Instructions for the host control software 815 may be stored in memory 806 or persistent storage 808 for execution by processor(s) 804. In one form, the host control software 815 may take the form of instructions that, when executed by the processor(s) 804, cause the computing device 800 to perform the host device/hICN forwarder operations described herein in connection with FIGS. 1-6. The memory 806 may also store the full CS, including CS indices 820 and CS data 825.

The inter-device bus controller 810 may be configured to perform operations to enable inter-device communication with a SmartNIC, and/or other devices. In one example, the inter-device bus controller 810 is configured to operate in accordance with the PCIe bus standard.

One or more programs may be stored in persistent storage 808 for execution by one or more of the processors 804 via one or more memories of memory 806. The persistent storage 808 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. Software and data used to practice embodiments can be stored on such portable computer readable storage media and can be loaded onto persistent storage 808.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

There are many useful and challenging scenarios for hICN in live content distribution, such as when the majority of the traffic consists of a few number of high popular requests. In such situations, where a bottleneck might be with a CPU or inter-device bus bandwidth, it may be beneficial to offload the tasks of answering interest with data packets found in a Content Store, to a SmartNIC. Different architectures are possible, from fully offloading the a SmartNIC, to a relaxed scheme allowing host involvement for additional flexibility and accounting, while still reserving the input/output intensive operations to the SmartNIC. Situations like live streaming events (sports events, release of a new show, etc.) present specific challenges that are difficult to solve in a cost-effective way using regular IP equipment. hICN offers significant improvements in this context, and the possibility of offloading some tasks in hardware may help to further scale the infrastructure without incurring costs for exceptional traffic scenarios.

In summary, in one form, a method is provided comprising: at a smart network interface card (SmartNIC) that is in communication with a host device that serves as a forwarder in an Hybrid Information-Centric Network (hICN), storing in a memory of the SmartNIC, mapping information that maps a subset of names of content contained in a content store that is stored in a memory of the host device to corresponding addresses of data in the content store; receiving at the SmartNIC, from a requester, an interest that includes a name; determining whether the name of the interest is included in the mapping information stored in the SmartNIC; and processing the interest based on whether the name of the interest is contained in the mapping information stored in the memory of the SmartNIC.

In another form, an apparatus is provided comprising: a plurality of ports configured to receive network traffic and to send network traffic; a bus controller configured to communicate with a host device that serves as a forwarder in an Hybrid Information-Centric Network (hICN); a memory configured to store mapping information that maps a subset of names of content contained in a content store that is stored in a memory of the host device to corresponding addresses of data in the content store; a controller configured to perform operations including: obtaining from a requester an interest received at one of the plurality of ports, the interest including a name; determining whether the name of the interest is included in the mapping information stored in the memory; and processing the interest based on whether the name of the interest is contained in the mapping information stored in the memory.

In still another form, a system is provided comprising: a host device that serves as a forwarder in an Hybrid Information-Centric Network (hICN), the host device including a memory that stores content for a content store; and a smart network interface card (SmartNIC) configured to be in communication with the host device, the SmartNIC including a memory, wherein the SmartNIC is configured to: store in the memory of the SmartNIC, mapping information that maps a subset of names of the content contained in the content store that is stored in the memory of the host device to corresponding addresses of data in the content store; receive at the SmartNIC, from a requester, an interest that includes a name; determine whether the name of the interest is included in the mapping information stored in the SmartNIC; and process the interest based on whether the name of the interest is contained in the mapping information stored in the memory of the SmartNIC.

In still another form, one or more non-transitory computer readable storage media are provided, encoded with instructions that, when executed by a processor of a smart network interface card (SmartNIC) that is in communication with a host device that serves as a forwarder in an Hybrid Information-Centric Network (hICN), cause the processor of the SmartNIC to perform operations including: storing in a memory of the SmartNIC, mapping information that maps a subset of names of content contained in a content store that is stored in a memory of the host device to corresponding addresses of data in the content store; receiving at the SmartNIC, from a requester, an interest that includes a name; determining whether the name of the interest is included in the mapping information stored in the SmartNIC; and processing the interest based on whether the name of the interest is contained in the mapping information stored in the memory of the SmartNIC.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at a smart network interface card (SmartNIC) that is in communication with a host device, storing in a memory of the SmartNIC, mapping information that maps a subset of names of content included in a content store that is stored in a memory of the host device to corresponding addresses of data in the content store, wherein the subset of names of content includes names of most frequently accessed content included in the content store and an identification of the subset of names of content included in the mapping information is based on a statistical analysis of names included in interests received at the host device;
    receiving at the SmartNIC, from a requester, a Hybrid Information-Centric Network (hICN) interest that includes a name;
    determining, by the SmartNIC, whether the name of the hICN interest is included in the mapping information stored in the SmartNIC; and
    processing, by the SmartNIC, the hICN interest based on whether the name of the hICN interest is included in the mapping information stored in the memory of the SmartNIC, wherein when it is determined that the name is included in the mapping information, the processing includes:
        generating interest packet metadata that includes the name of the hICN interest and an indication that a match for the name of the hICN interest is found in the mapping information stored in the memory of the SmartNIC;
        providing the interest packet metadata to the host device to enable the host device to generate packet header metadata, wherein the packet header metadata includes an address in the memory of the host device for data to be retrieved by the SmartNIC and an indication that the data to be retrieved by the SmartNIC is packet header data; and
        obtaining the packet header metadata from the host device.

2. The method of claim 1, further comprising:
    first determining that the name of the hICN interest is included in the mapping information;
    second determining, based on the mapping information and in response to the first determining, an address in the memory of the host device that corresponds to the name;
    retrieving, by the SmartNIC, data stored at the address in the memory of the host device;
    generating, by the SmartNIC, a data packet that includes the data and a destination address that corresponds to a source address of the hICN interest; and
    forwarding, by the SmartNIC, the data packet to the requester.

3. The method of claim 1, further comprising:
    determining that the name is not included in the mapping information stored in the memory of the SmartNIC;
    forwarding, in response to the determining, the hICN interest to the host device;
    receiving, at the SmartNIC, from the host device, a data packet including data corresponding to the name of the hICN interest; and
    forwarding, by the SmartNIC, the data packet to the requester.

4. The method of claim 1, further comprising:
    storing, in the memory of the SmartNIC, the data for the subset of names of content included in the mapping information.

5. The method of claim 4, wherein the mapping information maps the subset of names of content stored to corresponding addresses in the memory of the SmartNIC.

6. The method of claim 5, wherein when it is determined that the name is included in the mapping information stored in the memory of the SmartNIC, the processing includes:
    retrieving, by the SmartNIC, data stored at an address in the memory of the SmartNIC;
    generating, by the SmartNIC, a data packet that includes the data and a destination address that corresponds to a source address of the hICN interest; and
    forwarding, by the SmartNIC, the data packet to the requester.

7. The method of claim 5, wherein when it is determined that the name is included in the mapping information stored in the memory of the SmartNIC, the processing further includes:
    retrieving, by the SmartNIC, the data for the hICN interest stored at the address in the memory of the SmartNIC;
    based on the indication and the address contained in the packet header metadata,
    retrieving, by the SmartNIC, the data at the address in the memory of the host device that is to be used as the packet header data;
    generating, by the SmartNIC, a data packet that includes the data retrieved from the memory of the SmartNIC, the packet header data retrieved from the memory of the host device, and a destination address that corresponds to a source address of the hICN interest; and forwarding, by the SmartNIC, the data packet to the requester.

8. The method of claim 7, wherein the packet header data includes data to support one or more networking services for the data packet.

9. The method of claim 1, wherein the subset of names of content included in the mapping information is for relatively high popular data associated with relatively short intervals of video content of a video streaming event.

10. A network interface card, comprising:
a plurality of ports configured to receive network traffic and to send network traffic;
a bus controller configured to communicate with a host device that serves as a forwarder in an Hybrid Information-Centric Network (hICN);
a memory configured to store mapping information that maps a subset of names of content contained in a content store that is stored in a memory of the host device to corresponding addresses of data in the content store, wherein the subset of names of content includes names of most frequently accessed content included in the content store and an identification of the subset of names of content included in the mapping information is based on a statistical analysis of names included in interests received at the host device; and
a controller configured to perform operations including:
obtaining from a requester an hICN interest received at one of the plurality of ports, the hICN interest including a name;
determining whether the name of the hICN interest is included in the mapping information stored in the memory; and
processing the hICN interest based on whether the name of the hICN interest is included in the mapping information stored in the memory, wherein, when the name of the hICN interest is included in the mapping information, the controller is further configured to perform operations comprising:
generating interest packet metadata that includes the name of the hICN interest and an indication that a match for the name of the hICN interest is found in the mapping information stored in the memory of the network interface card;
providing the interest packet metadata to the host device to enable the host device to generate packet header metadata, wherein the packet header metadata includes an address in the memory of the host device for data to be retrieved by the network interface card and an indication that the data to be retrieved by the network interface card is packet header data; and
obtaining the packet header metadata from the host device.

11. The network interface card, of claim 10, wherein the operations further comprise:
determining that the name of the hICN interest is included in the mapping information;
determining an address corresponding to the name in the mapping information;
retrieving, in response to the determination, data stored at the address;

generating a data packet that includes the data and a destination address that corresponds to a source address of the hICN interest; and forwarding the data packet, via one of the plurality of ports, to the requester.

12. The network interface card of claim 10, wherein the operations further comprise storing, in the memory, data mapped to the name that is included in the mapping information.

13. The network interface card of claim 12, the operations further comprising:
determining that the name is included in the mapping information;
retrieving data stored at an address in the memory of the network interface card;
generating a data packet that includes the data and a destination address that corresponds to a source address of the hICN interest; and
forwarding the data packet, via one of the plurality of ports, to the requester.

14. The network interface card of claim 12, the operations further comprising:
retrieving the data for the hICN interest stored at the address in the memory of the network interface card;
based on the indication and the address contained in the packet header metadata,
retrieving the data at the address in the memory of the host device that is to be used as the packet header data;
generating a data packet that includes the data retrieved from the memory of the network interface card, the packet header data retrieved from the memory of the host device, and a destination address that corresponds to a source address of the hICN interest; and
forwarding the data packet, via one of the plurality of ports, to the requester.

15. A system comprising:
a host device that serves as a forwarder in an Hybrid Information-Centric Network (hICN), the host device including a memory that stores content for a content store; and
a smart network interface card (SmartNIC) configured to communicate with the host device, the SmartNIC including a memory, wherein the SmartNIC is configured to perform operations comprising:
storing in the memory of the SmartNIC, mapping information that maps a subset of names of the content included in the content store to corresponding addresses of data in the content store, wherein the subset of names of content includes names of most frequently accessed content included in the content store and an identification of the subset of names of content included in the mapping information is based on a statistical analysis of names included in interests received at the host device;
receiving at the SmartNIC, from a requester, an hICN interest that includes a name;
determining at the SmartNIC, whether the name of the hICN interest is included in the mapping information stored in the SmartNIC; and
processing at the SmartNIC, the hICN interest based on whether the name of the hICN interest is contained in the mapping information stored in the memory of the SmartNIC, wherein, when the name of the hICN interest is contained in the mapping information, the processing further includes:

generating interest packet metadata that includes the name of the hICN interest and an indication that a match for the name of the hICN interest is found in the mapping information;

providing the interest packet metadata to the host device to enable the host device to generate packet header metadata, wherein the packet header metadata includes an address in the memory of the host device for data to be retrieved by the SmartNIC and an indication that the data to be retrieved by the SmartNIC is packet header data; and obtaining the packet header metadata from the host device.

16. The system of claim 15, wherein the mapping information maps each name in the subset of names to a corresponding address in the memory of the host device, of data associated with the name, and wherein when the SmartNIC determines that the name of the hICN interest is included in the mapping information stored in the memory of the SmartNIC, the processing further includes:

performing a memory access read operation by the SmartNIC from the memory of the host device based on the address contained in the mapping information for the name;

retrieving, by the SmartNIC, data stored at the address in the memory of the host device;

generating, by the SmartNIC, a data packet that includes the data and a destination address that corresponds to a source address of the hICN interest; and forwarding, by the SmartNIC, the data packet to the requester.

17. The system of claim 15, wherein the memory of the SmartNIC further stores the data for the subset of names included in the mapping information, and the mapping information maps each of the names of the content to an address of corresponding content data stored in the memory of the SmartNIC, wherein when the SmartNIC determines that the name is included in the mapping information stored in the memory of the SmartNIC, the processing further includes:

retrieving, by the SmartNIC, data stored at an address in the memory of the SmartNIC;

generating, by the SmartNIC, a data packet that includes the data retrieved from the memory of the SmartNIC and a destination address that corresponds to a source address of the hICN interest; and forwarding, by the SmartNIC, the data packet to the requester.

18. The system of claim 15, wherein the memory of the SmartNIC further stores the data for the subset of names included in the mapping information, and the mapping information maps the subset of names of the content stored to corresponding addresses in the memory of the SmartNIC, wherein when the SmartNIC determines that the name is included in the mapping information stored in the memory of the SmartNIC, and wherein the processing further includes:

generating interest packet metadata that includes the name of the hICN interest and an indication that a match for the name of the hICN interest is found in the mapping information stored in the memory of the SmartNIC.

19. The system of claim 15, the operations further comprising storing, in the memory of the SmartNIC, the data for the subset of names of content included in the mapping information.

20. The system of claim 19, wherein the mapping information maps the subset of names of content stored to corresponding addresses in the memory of the SmartNIC.

* * * * *